United States Patent Office 3,485,813
Patented Dec. 23, 1969

3,485,813
DIS-BENZOTHIAZOLYLAZO DYES
Max A. Weaver and John I. Dale, Kingsport, Tenn., assignors to Eastman Kodak Company, Rochester, N.Y., a corporation of New Jersey
No Drawing. Filed July 11, 1966, Ser. No. 564,011
Int. Cl. C09b *33/06*
U.S. Cl. 260—158          8 Claims

ABSTRACT OF THE DISCLOSURE

Disazo compounds containing two benzothiazolyl-azo-aniline moieties joined by the group

—$CH_2CH_2SO_2CH_2CH_2$— which is attached to the nitrogen atom of each aniline coupling component. The disclosed compounds are useful for dyeing hydrophobic textile materials.

---

This invention relates to novel disazo compounds and, particularly, to water insoluble disazo dyes for hydrophobic textile materials.

The novel disazo compounds of the invention are characterized by the general formula (I)
$$R-N=N-R^1-N\begin{array}{c}R^2\\ \diagdown\\ CH_2CH_2SO_2CH_2CH_2\end{array}\begin{array}{c}R^3\\ \diagup\\ \end{array}N-R^4-N=N-R$$

wherein R is a benzothiazolyl group having the structure $$X_{(m)}-\underset{S}{\underset{|}{\diagup\!\!\!\!\diagdown}}\overset{N}{\underset{\diagdown\!\!\!\!\diagup}{}}$$

wherein X represents hydrogen, alkyl, e.g. methyl ethyl; trifluoromethyl; alkoxyl, e.g. methoxyl; e.g. acetamido; nitro; halogeno, e.g. chloro, bromo; cyano; alkylsulfonyl, e.g. methylsulfonyl; substituted alkylsulfonyl, e.g. cyanoethylsulfonyl, hydroxyethylsulfonyl; carbamoyl; N-alkylcarbamoyl, e.g. N,N - dimethylcarbamoyl; benzamido; aralkylamino, e.g. benzylamino; N-alkylarylamino, e.g. N - methylphenylamino; alkoxycarbonyl, e.g. ethoxycarbonyl; acyl, e.g. acetyl; formyl; alkylsulfonamido, e.g. methylsulfonamido, ethylsulfonamido; sulfamoyl; N-alkylsulfamoyl, e.g. N,N-dimethylsulfamoyl; dicarboxylicacidimido, e.g. succinimido; thiocyanato; alkylthio, e.g. methylthio; phenoxyl; benzoyl; combinations thereof; and ($m$) represents 1, 2 or 3;

$R^1$ and $R^4$ represent monocyclic carbocyclic aromatic groups of the benzene series having the structure $$-\underset{Y_{(n)}}{\underset{|}{\diagdown\!\!\!\!\diagup}}-$$

wherein Y, in $R^1$ and $R^4$, can be the same or different and represents hydrogen, alkyl, e.g. methyl, ethyl; alkoxyl, e.g. methoxyl, e.g. acetamido; halogeno, e.g. chloro, bromo; benzamido; benzylamino; N-alkylarylamino, e.g. N - methylphenylamino, dicarboxylicacidimido, e.g. succinimido; alkylthio, e.g. methylthio; aryloxyl, e.g. phenoxyl; combinations thereof; and $n$ represents 1, 2 or 3; and $R^2$ and $R^3$ can be the same or different and represent hydrogen or an alkyl radical, preferably lower alkyl, i.e. from 1 to 4 carbon atoms, being unsubstituted or substituted such as hydroxyalkyl, e.g. hydroxyethyl, polyhydroxyalkyl, e.g. 2,3-dihydroxypropyl, alkoxyalkyl, e.g. methoxyethyl, cyanoalkyl, e.g. cyanoethyl, cyanoalkoxyalkyl, e.g. beta-cyanoethoxyethyl, e.g. acetoxyethyl, halogenoalkyl, e.g. chloroethyl, alpha-chloropropyl, bromoethyl, hydroxyhalogenoalkyl, e.g. beta chlorogamma hydroxy, alkylsulfonylalkyl, e.g. methylsulfonylethyl, alkyl-$OCOOCH_2CH_2$— e.g., $CH_3OCOOCH_2CH_2$—, alkyl, e.g. dicarboxylic acid imidoalkyl, e.g. succinimidoethyl; benzyl; phenoxyalkyl, e.g. beta-phenoxyethyl; alkylsulfonamidoalkyl, e.g. methylsulfonamidoethyl; carbamatoalkyl, e.g. carbamatoethyl; and the like. Preferably, the alkyl moiety of the substituents represented by X, Y, $R^2$ and $R^3$ have up to about four carbon atoms.

The disazo compounds of the invention are prepared by coupling the conventional diazonium salts of compounds having the formula (II)          $R-NH_2$ with unsymmetrical coupling components having the formula (III)
$$R^1-N\begin{array}{c}R^2\\ \diagdown\\ CH_2CH_2SO_2CH_2CH_2\end{array}\begin{array}{c}R^3\\ \diagup\\ \end{array}N-R^4$$

wherein $R^1$ and $R^4$ may be the same or different and $R^2$ and $R^3$ may be the same or different but either $R^1$ must be different than $R^4$ or $R^2$ must be different than $R^3$, or with symmetrical coupling components having the formula (IV)
$$R^1-N\begin{array}{c}R^2\\ \diagdown\\ CH_2CH_2SO_2CH_2CH_2\end{array}\begin{array}{c}R^3\\ \diagup\\ \end{array}N-R^4$$

wherein $R^1=R^4$ and $R^2=R^3$ and wherein R, $R^1$, $R^2$, $R^3$ and $R^4$ are defined as set forth above with reference to Formula I.

The unsymmetrical couplers of Formula III are prepared by reacting one mole of an appropriately substituted aryl amine with one mole of divinylsulfone in the presence of a catalyst such as acetic acid and contacting the reaction product, a vinylsulfonylethyl aryl amine, with one mole of a different aryl amine, as set forth in the following illustrative sequence;

$$Ar\underset{H}{\overset{R^2}{\diagdown\!\!\!\!\!N\diagup}} + (CH_2=CH)_2SO_2 \xrightarrow{HOAc}$$

$$Ar\underset{C_2H_4SO_2CH=CH_2}{\overset{R^2}{\diagdown\!\!\!\!\!N\diagup}} + Ar^1\underset{H}{\overset{R^3}{\diagdown\!\!\!\!\!N\diagup}} \xrightarrow{HOAc}$$

$$Ar\underset{C_2H_4SO_2C_2H_4}{\overset{R^2}{\diagdown\!\!\!\!\!N\diagup}}\overset{R^3}{\underset{}{\diagdown\!\!\!\!\!N\diagup}}Ar^1$$

wherein Ar and $Ar^1$ represents either $R^1$ or $R^4$ of Formula I wherein $R^1$ and $R^4$ are the same or different and $R^2$ and $R^3$ are the same or different but either $R^1$ is different than $R^4$ or $R^2$ is different than $R^3$ and are defined as set forth in Formula I.

The symmetrical couplers of Formula IV are prepared by reacting two moles of an appropriately substituted aryl amine with one mole of divinyl-sulfone in the presence of acetic acid catalyst, as set forth in the following illustrative sequence:

$$2Ar\underset{H}{\overset{R^2 (or\ R^3)}{\diagdown\!\!\!\!\!N\diagup}} + (CH_2=CH)_2SO_2 \xrightarrow{HOAc} \left(Ar\underset{C_2H_3}{\overset{R^2 (or\ R^3)}{\diagdown\!\!\!\!\!N\diagup}}\right)_2 SO_2$$

wherein $Ar=R^1=R^4$ and $R^2=R^3$ and wherein $R^1$, $R^2$, $R^3$ and $R^4$ are defined above in Formula I.

The following examples will serve to illustrate the preparation of representative couplers and disazo compounds of the invention. As will be seen from the examples, the substituents X, Y, $R^2$ and $R^3$ as defined in Formula I serve primarily as auxochrome groups to control the color of the disazo compound.

PREPARATION OF SYMMETRICAL COUPLERS

Preparation of bis [2(N-ethyl-m-toluidino)ethyl] sulfone

An amount of 27.0 g. N-ethyl-m-toluidine, 11.8 g. divinylsulfone, 5 cc. glacial acetic acid, and 50 cc. toluene was refluxed for 24 hr. The toluene and acetic acid were removed under vacuum and the residue taken up in 150 ml. of ethanol. This solution was chilled for 2 hr. at near 0° C. and the white crystalline product was collected by filtration. Yield 2.14 g. M.P. 58–61°. It had the structure:

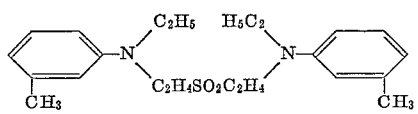

Preparation of bis[2-(n-beta-hydroxyethyl-m-toluidino) ethyl]sulfone

The above procedure was repeated, substituting N-beta-hydroxyethyl-m-toluidine for N-ethyl-m-toluidine. The product had the structure:

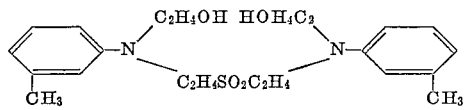

In accordance with the above procedures, bis[2-(N-ethylanilino)ethyl]sulfone was prepared from N-ethylaniline and divinylsulfone and bis[2-(N-methyl-m-toluidino)ethyl]-sulfone was prepared from N-methyl-m-toluidine and divinyl-sulfone.

PREPARATION OF SYMMETRICAL DYES

EXAMPLE 1

A solution of 4.56 g. of 2-amino-6-methylsulfonylbenzothiazole in 100 g. 50% aqueous sulfuric acid was cooled to −5° C. and a solution of 1.44 g. of $NaNO_2$ dissolved in 10 ml. conc. $H_2SO_4$ was added, keeping the temperature less than 0° C. The diazotization reaction was stirred 1.75 hr. at 0° C., then added to a solution of 3.88 g. bis[2-(N-ethyl-m-toluidino)ethyl]sulfone in 100 ml. 15% sulfuric acid, all at about 5° C. The coupling was continued at this temperature for 2 hr., then drowned with water, filtered, washed with water, and air dried. The product dyes cellulose acetate and polyester fibers a brilliant red shade with good fastness properties. This dye had the structure:

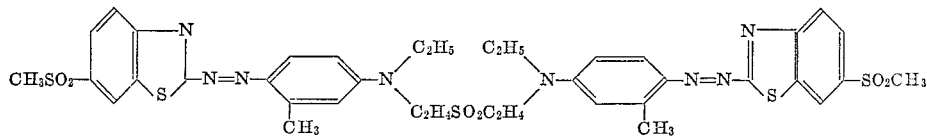

EXAMPLE 2

Sodium nitrite (1.44 g.) was added portionwise to 10 ml. conc. $H_2SO_4$; the solution was cooled in an ice bath to about 2° C. and 20 ml. 1:5 acid (1 part propionic acid:5 parts acetic acid) was added below 15° C. Then at below 10° C., 3.50 g. 2-amino-6-cyanobenzothiazole was added followed by 20 ml. 1:5 acid. The reaction was stirred 2 hr. at 0–5° C. and added to a solution of 4.05 g. of bis[2-(N-beta-hydroxyethyl-m-toluidino)2-ethyl]sulfone in 100 ml. 1:5 acid at 5° C. Solid ammonium acetate was added until the solution turned Congo Red paper brown and the coupling allowed to stand 2 hr. at ice bath temperature. It was then drowned with water, filtered, washed with water and air dried. It dyes cellulose acetate a bright red shade, and had the following structure:

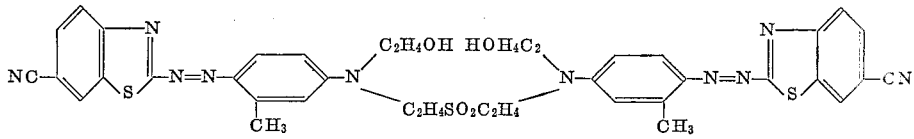

EXAMPLE 3

2-amino-6-methylsulfonylbenzothiazole (4.56 g.) was diazotized as in Example 1 and added to a solution of 3.60 g. bis[2-(N-ethylanilino)ethyl]sulfone in 100 ml. 15% $H_2SO_4$, all at 0–5° C. The coupling was continued at this temperature for 2 hr., then drowned with water, filtered, washed with water, and the product air dried. It dyed polyester fibers red and had the structure

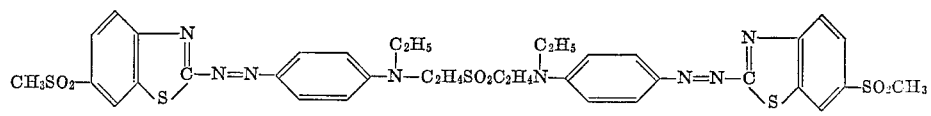

EXAMPLE 4

2-amino-6-methylsulfonylbenzothiazole (4.56 g.) was diazotized and coupled with 3.60 g. bis[2-(N-methyl-m-toluidino)-ethyl]sulfone as illustrated in the above examples. This dye colored polyester fibers red. It had the structure:

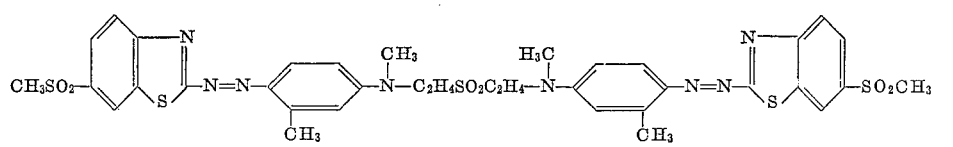

The disazo compounds illustrated in the following table are prepared by the procedure illustrated in Examples 1 to 4, above. Thus, the appropriate compounds of Formula II are coupled with suitable couplers of Formula IV to obtain the compounds of Formula I wherein $R^1=R^4$ and $R^2=R^3$.

TABLE

| Example | Substituent (X) on R | R¹, R⁴ | R², R³ | Color |
|---|---|---|---|---|
| 5 | 6-CH₃SO₂ | Phenylene | —C₂H₅ | Red. |
| 6 | 6-CH₃SO₂ | m-Tolylene | —CH₃ | Red. |
| 7 | 6-CH₃SO₂ | m-CH₃O-phenylene | —C₂H₅ | Violet. |
| 8 | 6-CH₃SO₂ | m-Cl phenylene | —C₂H₅ | Red. |
| 9 | 6-CH₃SO₂ | O-tolylene | H | Scarlet. |
| 10 | 6-CH₃SO₂ | 2,5-di-OCH₃-phenylene | —C₂H₅ | Violet. |
| 11 | 6-CH₃SO₂ | m-NHCOCH₃ phenylene | —C₂H₅ | Do. |
| 12 | 6-NO₂ | m-Tolylene | —C₂H₅ | Do. |
| 13 | 6-NO₂ | do | —C₂H₄OH | Do. |
| 14 | 6-NO₂ | do | —C₂H₄Cl | Do. |
| 15 | 6-CN | Phenylene | C₂H₄Br | Red. |
| 16 | 6-CN | m-Tolylene | C₂H₄OCH₃ | Red. |
| 17 | 6-CN | do | —C₂H₄CO₂C₂H₅ | Do. |
| 18 | 6-CN | do | —C₂H₄SO₂CH₃ | Do. |
| 19 | 6-CN | do | —C₂H₄CN | Do. |
| 20 | 6-CN | do | —C₂H₄CONH₂ | Do. |
| 21 | 6-SO₂NH₂ | do | —C₂H₅ | Red. |
| 22 | 6-SO₂NH₂ | do | —C₄H₉-n | Red. |
| 23 | 6-SO₂CH₂CH₂OH | do | —C₂H₅ | Red. |
| 24 | 6-SO₂CH₂CH₂CN | do | —C₂H₅ | Scarlet. |
| 25 | 6-CH₃ | do | —C₂H₅ | Do. |
| 26 | None | do | —C₂H₅ | Do. |
| 27 | 6-OCH₃ | do | —C₂H₅ | Do. |
| 28 | 6-SCH₃ | do | —C₂H₅ | Do. |
| 29 | 6-SO₂C₄H₉-n | do | —C₂H₅ | Red. |
| 30 | 6-SO₂N(CH)₂ | do | —C₂H₅ | Red. |
| 31 | 6-SO₂NHCH₃ | do | —C₂H₅ | Red. |
| 32 | 4,6-dichloro | do | —C₂H₅ | Red. |
| 33 | 6-bromo | Phenylene | —C₂H₅ | Scarlet. |
| 34 | 6-NHCOCH₃ | m-Tolylene | —C₂H₅ | Red. |
| 35 | 6-SCH₂CH₂CN | do | —C₂H₅ | Red. |
| 36 | 4-CH₃-6-NO₂ | do | —C₂H₅ | Violet. |
| 37 | 6-SCN | do | —C₂H₅ | Red. |

PREPARATION OF UNSYMMETRICAL COUPLERS

Preparation of 2-[N-(2-N-ethyl-m-toluidino)-ethyl]-2'-[N-(N-ethyl-m-chloroanilino)ethyl]sulfone An amount of 25.3 g. N-ethyl-N-beta-vinylsulfonylethyl-m-toluidine, 15.5 g. N-ethyl-m-chloroaniline, 5 ml. acetic acid and 50 ml. toluene was refluxed for 24 hr. The toluene and acetic acid were removed under vacuum and the residue crystallized from ethanol. The coupler had the structure:

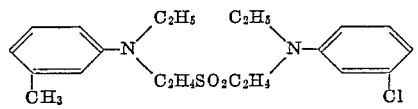

Preparation of 2-[N-(ethyl-2,5-dimethoxy-anilino)ethyl]-2'-[N-(N-beta-vinylsulfonylethyl]aniline)

An amount of 29.9 g. 2,5-dimethoxy-N-ethyl-N-beta-vinylsulfonylethylaniline 13.7 g. N-beta-hydroxyethylaniline 5 ml. acetic acid and 50 ml. toluene was refluxed for 24 hr. The toluene and acetic acid were removed under reduced pressure and the viscous oil obtained was used without further purification. The coupler had the structure:

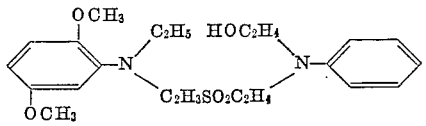

PREPARATION OF UNSYMMETRICAL DYES

EXAMPLE 38

A diazonium solution was prepared from 4.56 g. of 2-amino-6-methylsulfonylbenzothiazole as described in Example 1, and added to a solution of 4.08 g. of 2-[N-(2-ethyl-m-toluidino) - ethyl] - 2' - [N - ethyl-m-chloroanilino)ethyl]sulfone in 50 ml. 15% sulfuric acid all at 5° C. The coupling was continued 2 hr. then it was drowned with water, filtered, washed with water and air dried. The dye dyed cellulose acetate and polyester fiber red shades of good fastness. The dye had the structure:

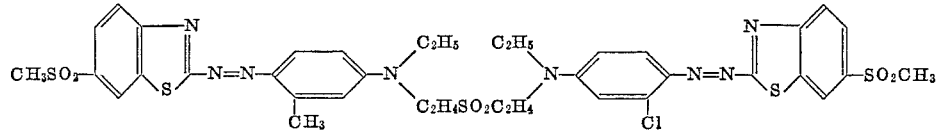

EXAMPLE 39

A diazonium solution was prepared from 3.50 g. 2-amino-6-cyanobenzothiazole as described in Example 2 and the resulting solution added to a solution of 4.36 g. 2-[N-(N-ethyl-2,5-dimethoxyanilino)ethyl] - 2' - [N-(N-beta-hydroxyethylanilino)ethyl]sulfone in 50 ml. 1:5 acid. Following neutralization to brown on Congo Red paper with solid ammonium acetate, coupling was continued 2 hr. The reaction mixture was then drowned in water and the precipitated dye filtered, washed with water and dried. It dyed cellulose acetate bright red shades of good fastness and had the structure:

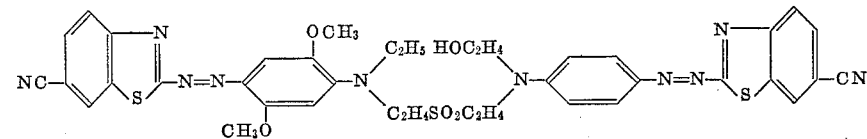

The disazo compounds in the following table are prepared by the procedure illustrated in Examples 38 and 39, above. Thus, the appropriate compounds of Formula II are coupled with suitable couplers of Formula III to obtain the compounds of Formula I wherein $R^1 \neq R^4$ and $R^2$ and $R^3$ may be the same or different.

aqueous dispersions in the manner of the so-called "dispersed dyes." However, coloration can also be effected, for example, by incorporating the compounds into the spinning dope and spinning the fiber as usual.

The compounds of the invention are not necessarily all equivalent as dyes. The degree of dye affinity varies,

TABLE

| Example | Substituent (X) on R | $R^1$ | $R^2$ | $R^3$ | $R^4$ | Color |
|---|---|---|---|---|---|---|
| 40 | 6-CH$_3$SO$_2$ | Phenylene | C$_2$H$_5$ | C$_2$H$_5$ | m-Tolylene | Red. |
| 41 | 6-NO$_2$ | m-CH$_3$O-phenylene | CH$_3$ | C$_2$H$_5$ | do | Violet. |
| 42 | 6-CN | m-Cl-phenylene | C$_2$H$_4$OH | C$_2$H$_5$ | do | Red. |
| 43 | 6-SO$_2$NH$_2$ | o-Tolylene | C$_2$H$_4$Cl | C$_2$H$_5$ | do | Red. |
| 44 | 6-SO$_2$CH$_2$CH$_2$OH | 2,5-di-OCH$_3$ phenylene | C$_2$H$_4$Br | C$_2$H$_5$ | do | Red. |
| 45 | 6-SO$_2$CH$_2$CH$_2$OH | m-NHCOCH$_3$ phenylene | C$_2$H$_4$OCH$_3$ | C$_2$H$_5$ | do | Red. |
| 46 | 6-CH$_3$ | 2-CH$_3$O-5-CH$_3$ phenylene | C$_2$H$_4$CO$_2$C$_2$H$_5$ | C$_2$H$_5$ | do | Scarlet. |
| 47 | None | 2-CH$_3$O-5-NHCOCH$_3$ phenylene | C$_2$H$_4$CN | C$_2$H$_5$ | do | Do. |
| 48 | 6-OCH$_3$ | Phenylene | C$_2$H$_4$CONH$_2$ | C$_2$H$_5$ | do | Do. |
| 49 | 6-SCH$_3$ | do | C$_4$H$_9$-n | C$_2$H$_5$ | do | Do. |
| 50 | 6-SO$_2$C$_4$H$_9$-n | do | C$_2$H$_5$ | C$_2$H$_5$ | do | Red. |
| 51 | 6-SO$_2$N(CH$_3$)$_2$ | do | C$_2$H$_5$ | C$_2$H$_5$ | do | Red. |
| 52 | 4,6-dichloro | do | C$_2$H$_5$ | C$_2$H$_5$ | do | Red. |
| 53 | 6-bromo | do | C$_2$H$_5$ | C$_2$H$_5$ | do | Red. |
| 54 | 6-NHCOCH$_3$ | do | C$_2$H$_5$ | C$_2$H$_5$ | do | Red. |
| 55 | 6-SCH$_2$CH$_2$CN | do | C$_2$H$_5$ | C$_2$H$_5$ | do | Red. |

The disazo compounds of the invention can be used for dyeing textile materials, including protein and synthetic polymer fibers, yarns and fabrics, giving a variety of fast brilliant violet to red shades when applied thereto by conventional dye methods. The disazo compounds have high affinity for cellulose ester, polyester, and nylon fibers. When the compounds are used for dyeing such hydrophobic materials, they should be free of water-solubilizing groups such as sulfo and carboxyl. In general, the dyes have excellent fastness, for example, to light, washing, gas (atmospheric fumes) and sublimation. The dyes are outstandingly sublimation resistant on polyesters.

As described above, the present disazo compounds have the characteristic structure of Formula I. This distinctive structure imparts unexpected properties to the compounds, including the above-described light fastness and sublimation resistance. Thus, the compounds of the invention have been found to possess excellent properties when tested by methods such as described in the A.A.T.C. Technical Manual, 1964 edition.

The compounds of the invention can be used for dyeing hydrophobic fibers such as linear polyester, cellulose ester, acrylic, polyamide, etc., fibers in the manner described in U.S. Patents 2,880,050; 2,757,064; 2,782,187 and 2,043,827. The following example illustrates a method by which the disazo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the compounds of the invention are water-insoluble, they can be applied from for example, depending upon the material being dyed and the formula of the disazo compound. Thus, for example, all the compounds will not have the same degree of dye affinity for the same material. Accordingly, the substituents X and Y and the substituents $R^2$ and $R^3$, as mentioned above, serve primarily as auxochrome groups to control the color of the disazo compound.

Polymeric linear polyester materials of the terephthalate type are illustrative of the linear aromatic polyester textile materials that can be dyed with the new disazo compounds of the invention. The terephthalate fibers sold under the trademarks "Kodel," "Dacron," and "Terylene," for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010; 2,957,745 and 2,989,363, for example, can be dyed. The linear aromatic polyester materials specifically named have a melting point of at least 200° C.

Nylon in fiber, yarn and fabric form, is representative of polyamides which can be dyed with the disazo compounds.

The invention has been described in considerable detail with particular reference to certain preferred embodiments thereof, but will be understood that variations and modifications can be effected within the spirit and scope of the invention.

We claim:

1. A disazo compound having the formula

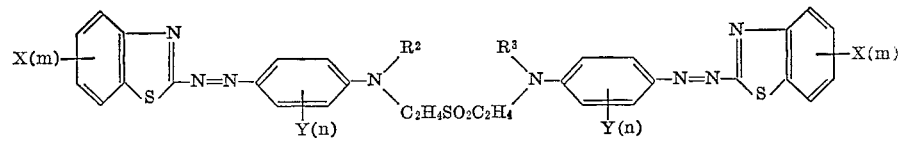

wherein
X is hydrogen, lower alkyl, lower alkoxyl, lower alkanoyl, formyl, trifluoromethyl, acetamido, nitro, chlorine, bromine, lower alkylsulfonyl, lower cyanoalkylsulfonyl, lower hydroxyalkylsulfonyl, cyano, carbamoyl, N-lower alkylcarbamoyl, benzamido, lower alkoxycarbonyl, loweralkylsulfonyl, sulfamoyl, N-lower alkylsulfamoyl, succinimido, thiocyanato, lower alkylthio, phenoxyl or benzoyl;

m is 1 or 2;

Y is hydrogen, lower alkyl, lower alkoxy, chlorine bromine, acetamido, or benzamido, each Y being the same or different;

$n$ is 1 or 2;

$R^2$ and $R^3$ are the same or different and each is hydrogen, lower alkyl, or lower alkyl substituted with hydroxy, lower alkoxy, chlorine, bromine, cyano, acetoxy, lower carbalkoxy, lower alkylsulfonyl, lower alkyl-OCOO—, —CONH$_2$, succinimido, phenyl, phenoxy, or lower alkylsulfonamido.

2. A disazo compound according to claim 1 having the formula

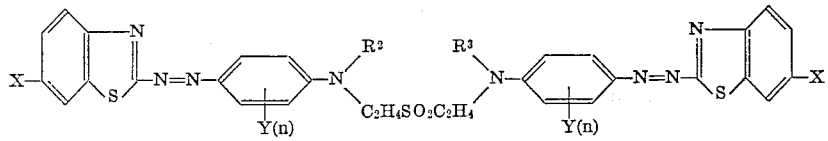

wherein

X is cyano, nitro, lower alkylsulfonyl, lower alkoxycarbonyl, or thiocyanato;

Y is hydrogen, lower alkyl, lower alkoxy, chlorine, bromine, acetamido, or benzamido;

$n$ is 1 or 2; and $R^2$ and $R^3$ each is lower alkyl; lower alkyl substituted with hydroxy, cyano, chlorine, bromine, or acetoxy; or benzyl.

3. A disazo compound according to claim 1 having the formula

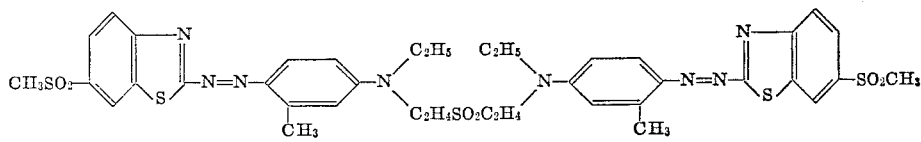

4. A disazo compound according to claim 1 having the formula

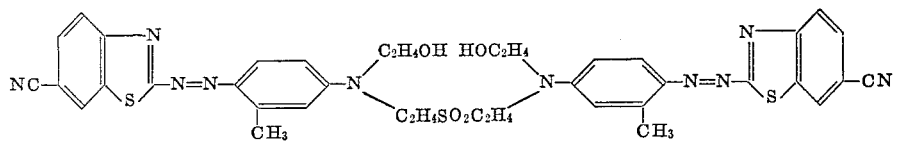

5. A disazo compound according to claim 1 having the formula

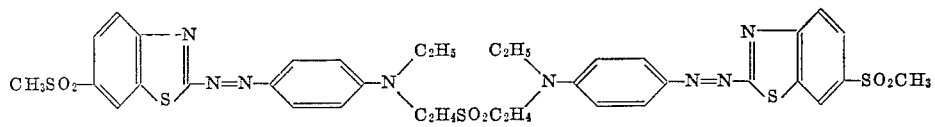

6. A disazo compound according to claim 1 having the formula

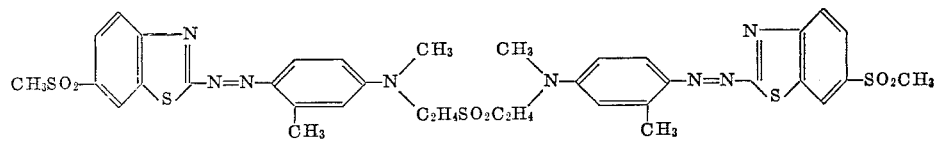

7. A disazo compound according to claim 1 having the formula

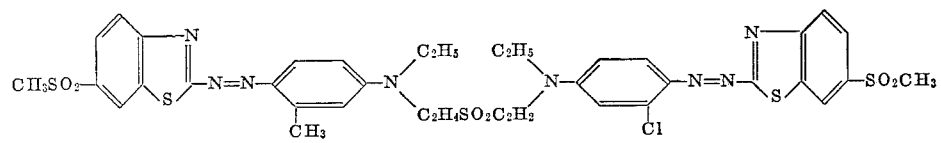

8. A disazo compound according to claim 1 having the formula
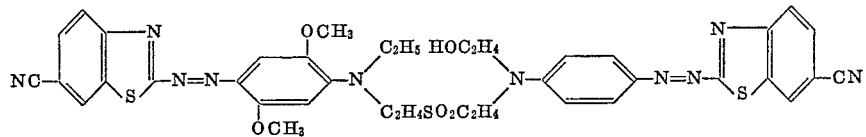
References Cited
UNITED STATES PATENTS
2,128,256   8/1938   Krzikalla et al. _____ 260—199
3,271,383   9/1966   Yamaya et al. _____ 260—158
CHARLES B. PARKER, Primary Examiner
DONALD M. PAPUGA, Assistant Examiner
U.S. Cl. X.R.
8—4, 41, 55; 260—40, 570.5